R. O. STUTSMAN.
STIRRING DEVICE.
APPLICATION FILED SEPT. 28, 1911.

1,044,706. Patented Nov. 19, 1912.

Witnesses
A. G. Hague
W. A. Loftus

Inventor
Ruben O. Stutsman
by J. Ralph Orwig att'y

UNITED STATES PATENT OFFICE.

REUBEN O. STUTSMAN, OF DES MOINES, IOWA.

STIRRING DEVICE.

1,044,706.  Specification of Letters Patent.  Patented Nov. 19, 1912.

Application filed September 28, 1911. Serial No. 651,782.

*To all whom it may concern:*

Be it known that I, REUBEN O. STUTSMAN, a citizen of the United States, and resident of Des Moines, in the county of Polk and State of Iowa, have invented a certain new and useful Stirring Device, of which the following is a specification.

The object of my invention is to provide a device by which popcorn or the like may be stirred thoroughly and steadily in a suitable vessel, and by which all the particles which are on the bottom of the vessel may be moved in the process of stirring.

I am aware that stirrers having beveled blades have been used, but they are subject to the objection that they move the material in the vessel around the same in a heap.

One of the objects of my invention is to move the particles nearest the bottom of the vessel where the heat is applied, without forming a heap.

A further object is to provide such a stirring device of simple, durable and inexpensive construction which may be readily taken apart for cleaning and easily reassembled.

A further object is to provide a stirring device of such construction that means for applying power to the stirring wires may be readily attached and detached.

My invention consists in certain details, in the construction, arrangement and combination of the various parts of the device, whereby the objects contemplated are attained, as hereinafter more fully set forth, pointed out in my claims and illustrated in the accompanying drawings, in which—

Figure 3:
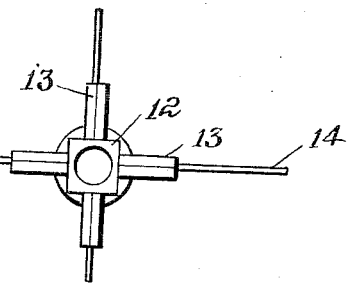
Figure 2:
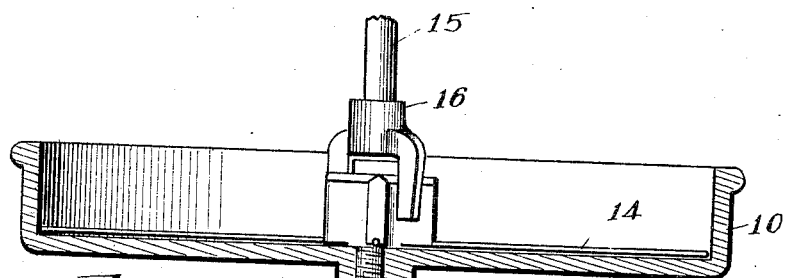
Figure 1:
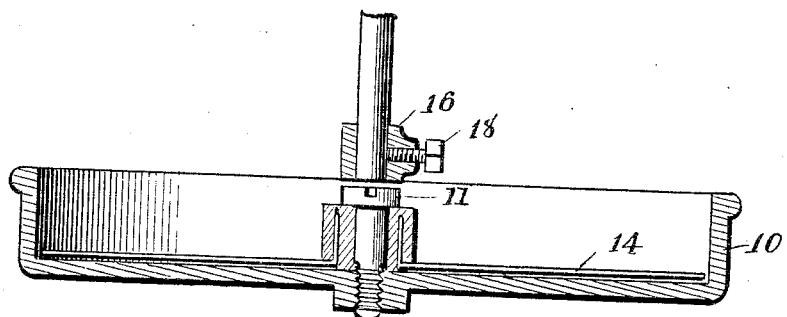
Figure 4:
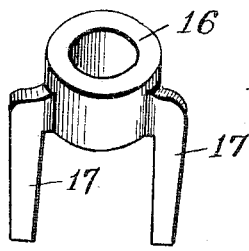

Figure 1 shows a side elevation, partly in section, of a vessel equipped with my improved stirring device. Fig. 2 shows a side elevation of a vessel equipped with my stirring device, the vessel being in section. Fig. 3 shows a top or plan view of the stirring wires, and Fig. 4 shows a detail view of a portion of my stirring device.

In the accompanying drawings, I have used the reference numeral 10 to indicate a vessel which may be made of any suitable material and is of ordinary construction. The vessel 10 is provided with a central screw threaded opening in its bottom designed to receive the screw threaded bolt 11. For stirring material placed in the vessel I have provided a block 12 which is constructed with a central opening designed to receive the bolt 11, the block 12 serving as a bearing for said bolt and being designed to move freely thereon. A plurality of extensions or lugs 13 extend from the block 12 in a plane parallel with the bottom of the vessel 10, and to the lugs 13 are secured spring wires 14 which extend approximately to the inner surface of the side wall of the passage 10, the upper surfaces of the lugs 13 are beveled to permit the arms 17, hereinafter described, to easily slide downward past the level of said upper surfaces. A power shaft 15 is rotatably mounted vertically above the center of the passage 10 and is designed to be secured in any suitable support above the vessels. Detachably mounted on the lower end of the shaft 15 is a cylindrical bearing 16 which is provided with downwardly extending arms 17 designed to extend to a point below the upper surfaces of the lugs 13 when the device is in position for operation. The bearing 16 is preferably provided with a screw threaded opening in which I place a set screw 18.

In the assembling of my device, the block 12, the lugs 13 and the wires 14 are placed in the vessel 10, the bolt 11 is screwed into place and the bearing 16 is moved downwardly on the shaft 15 until the lower ends of the arms 17 are below the level of the upper surfaces of the lugs 13. Rotary motion is then imparted to the shaft 15 and the wires 14 are rotated in the vessel 10.

My device is particularly intended for use with corn popping machines, or may be used for stirring other materials.

The construction above set forth may be varied in many particulars without affecting the purpose or efficiency of my improved stirring device.

The bolt 11 may be varied in form if desired. The manner of securing the lugs 13 at their inner ends may also be varied, it being necessary only to leave an opening at said inner ends which will form a bearing for the center post. The wires 14 may be made of any suitable material. I do not confine myself to any particular number of lugs 13 or wires 14. Any manner of applying rotary motion to the shaft 15 may be employed. The form of the bearing 16 and the method of securing the same to the shaft 15 may be varied as desired.

Many variations may be made in details of construction, without affecting the purpose of my device which is to provide means for rotating stiff wires or the like on the bottom of a retaining vessel for the purpose of stirring the contents thereof.

My device is especially designed for use with power corn popping machines, having means for imparting rotary motion to the shaft 15, a support on which the vessel 10 may be placed, and means for applying heat to said vessel.

My device has the advantage of thoroughly stirring and moving the particles of material on the bottom of the retaining vessel which are most likely to be burned. The speed of the wires 14 may be increased or diminished by varying the power applied to the shaft 15.

Instead of heaping the popcorn or other material in the vessel into piles and pushing them around the vessel, as is done by stirrers of the scraper blade type, my stirrer slides under the material, moving every particle which is on the bottom of the vessel, but permitting the surface of the contents of such vessel to remain level and even.

My stirrer requires less power for its operation than devices of the class mentioned.

In using the term wires in the following claims, I refer to any suitable material and form of stirring arm which will travel around the vessel on the bottom thereof, and permit the contents to readily slide over said stirring arms without piling up.

I claim as my invention:

1. In a device of the class described, a vessel, an upwardly extending bolt in the center thereof, a plurality of spring wires on the bottom of said vessel rotatably mounted on said bolt and extending radially therefrom, and means for imparting rotary motion to said stirring wires.

2. In a device of the class described, a vessel, a detachable upwardly extending bolt in the center thereof, constructed with radial extensions, a bearing rotatably mounted on said bolt, a plurality of stirring wires secured to said extensions and extending radially therefrom adjacent to the bottom of said vessel, a second bearing slidingly mounted on said shaft, means for detachably securing said cylindrical bearing at various positions of its adjustment on said shaft, downwardly extending arms on said second bearing designed to engage said extensions when said second bearing is in the lower position of its adjustment.

Des Moines, Iowa, February 23, 1911.

REUBEN O. STUTSMAN.

Witnesses:
M. WALLACE,
M. PETERSON.

---

Copies of this patent may be obtained for five cents each, by addressing the "Commissioner of Patents, Washington, D. C."